May 5, 1970     W. H. LICHFIELD     3,509,955

PROPULSION UNIT

Filed Nov. 24, 1967     4 Sheets-Sheet 1

INVENTOR:
WILLIAM H. LICHFIELD.

BY:

ATTORNEY

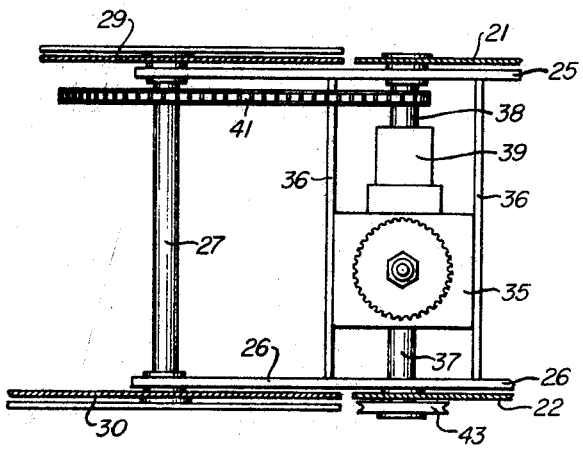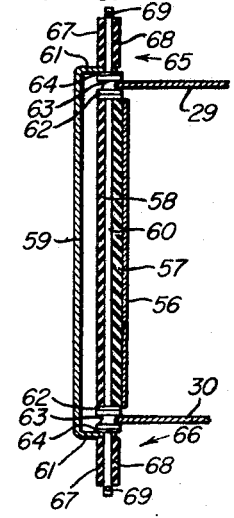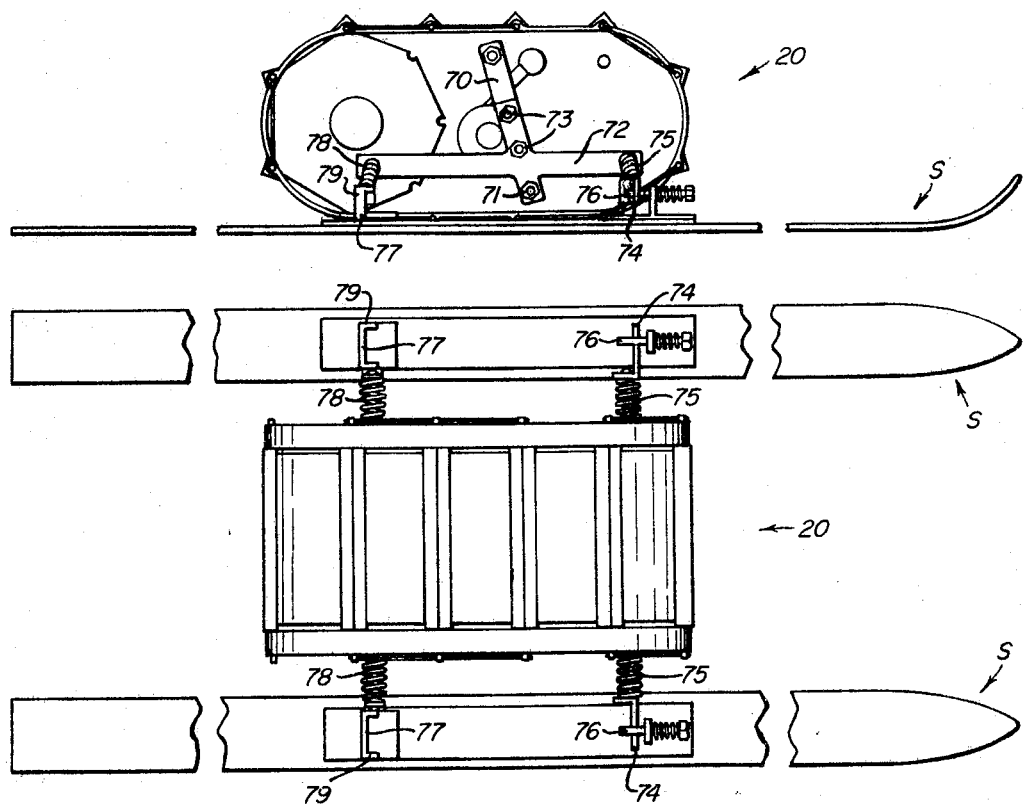

May 5, 1970  W. H. LICHFIELD  3,509,955
PROPULSION UNIT
Filed Nov. 24, 1967  4 Sheets-Sheet 3
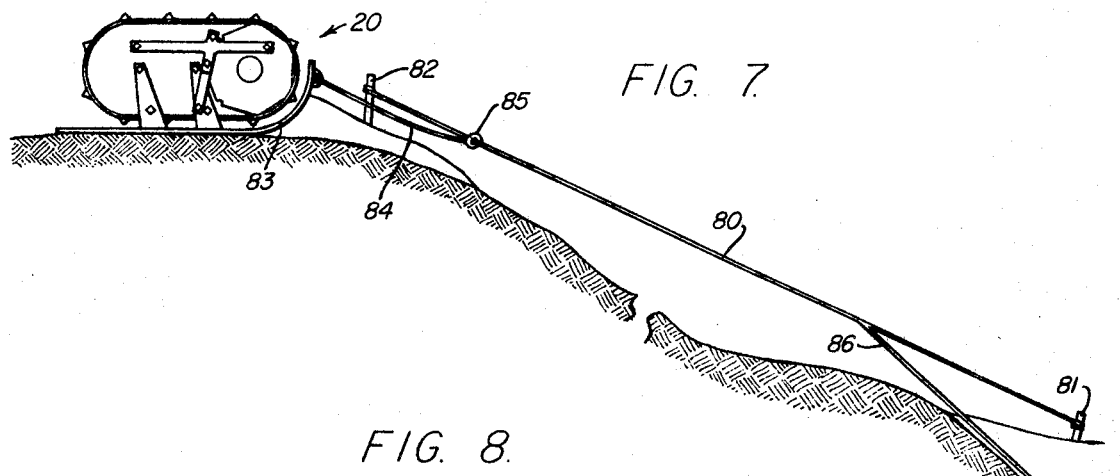
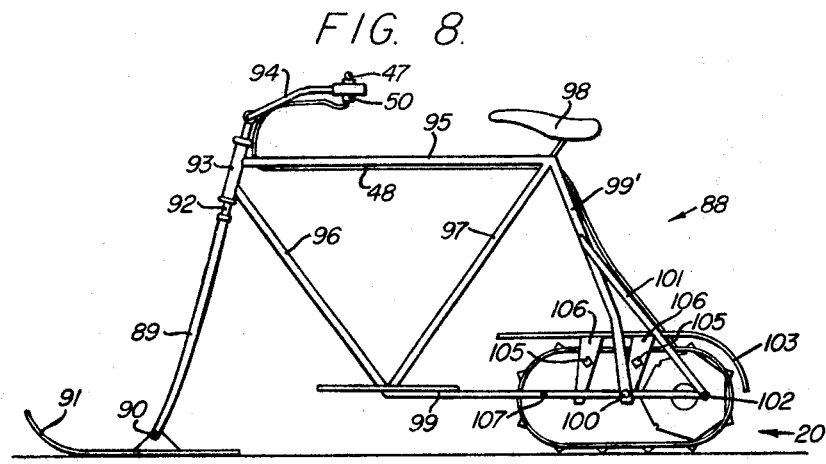
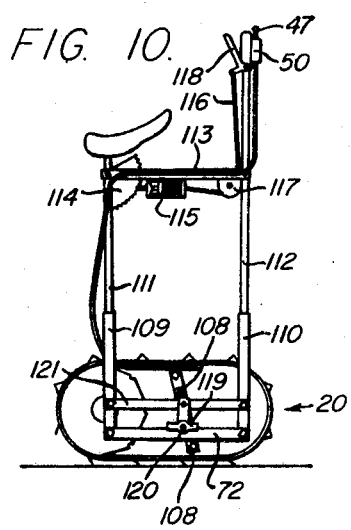
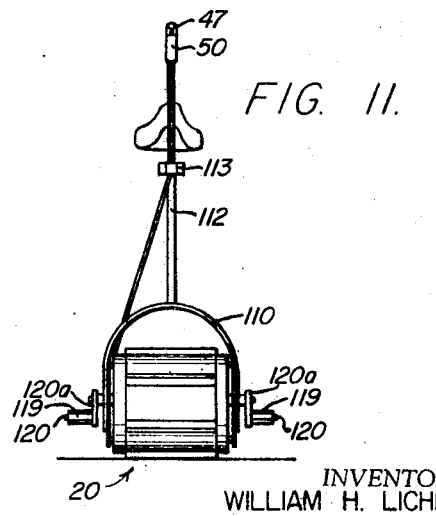
INVENTOR:
WILLIAM H. LICHFIELD
BY:
*B. Dean Criddle*
ATTORNEY May 5, 1970  W. H. LICHFIELD  3,509,955
PROPULSION UNIT
Filed Nov. 24, 1967  4 Sheets-Sheet 4
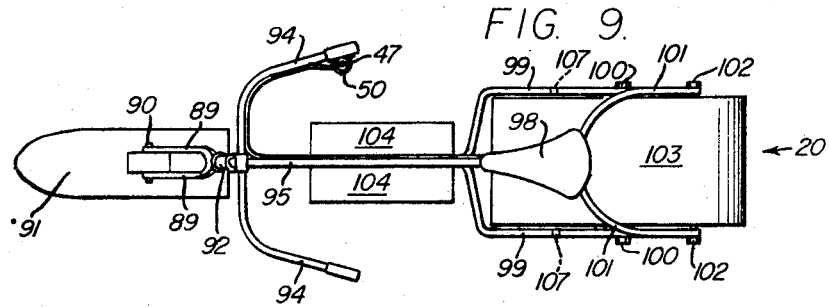
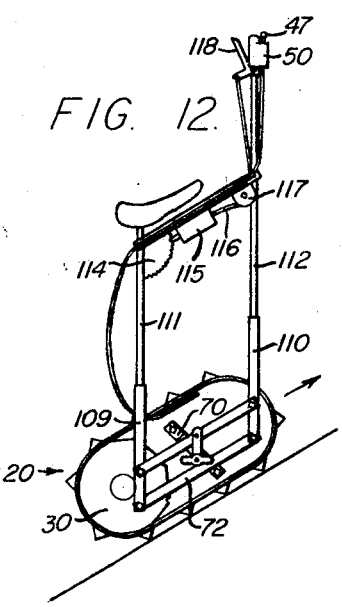
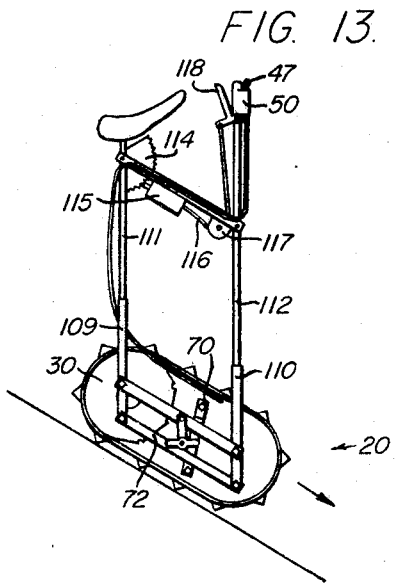
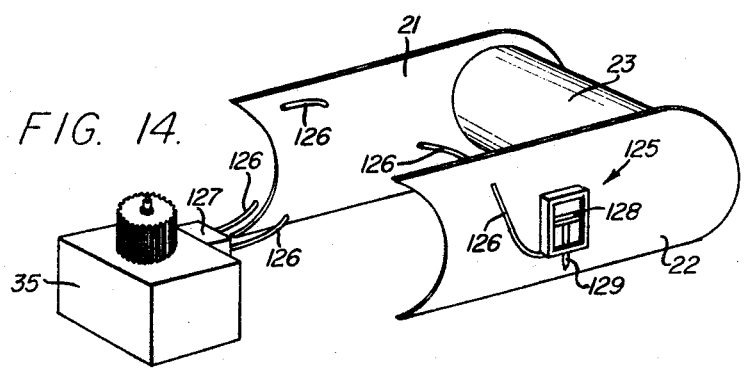
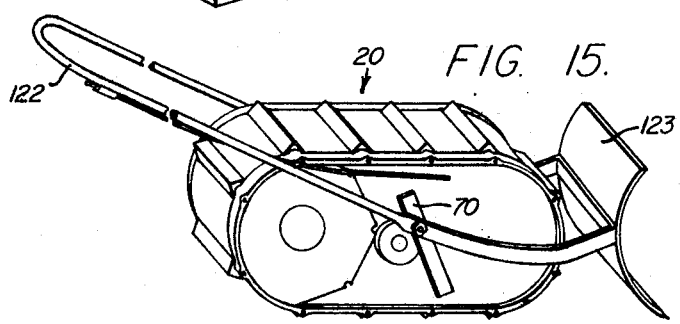
INVENTOR:
WILLIAM H. LICHFIELD.
BY:
ATTORNEY

United States Patent Office 3,509,955
Patented May 5, 1970

3,509,955
PROPULSION UNIT
William H. Lichfield, Corinne, Utah, assignor to
Troy A. Ray, Las Vegas, Nev.
Filed Nov. 24, 1967, Ser. No. 685,571
Int. Cl. B62m 27/02, 29/00
U.S. Cl. 180—5                                    14 Claims

ABSTRACT OF THE DISCLOSURE

A small, self-contained, endless track-type propulsion unit having a cover plate to deflect dirt, water, etc., and to alternatively serve as a skid for the propulsion unit. The power unit for the overall propulsion unit includes side plates, structurally interconnected by a gas tank, and an endless belt bridging and guided by the side plates and having traction cleats thereon. The motor for the power unit is positioned between the side plates, within the endless belt, and it drives the belt while creating a positive pressure within the space defined by the belt and the side plates so that dirt, mud, snow and the like cannot enter and accumulate therein.

Figure 1:
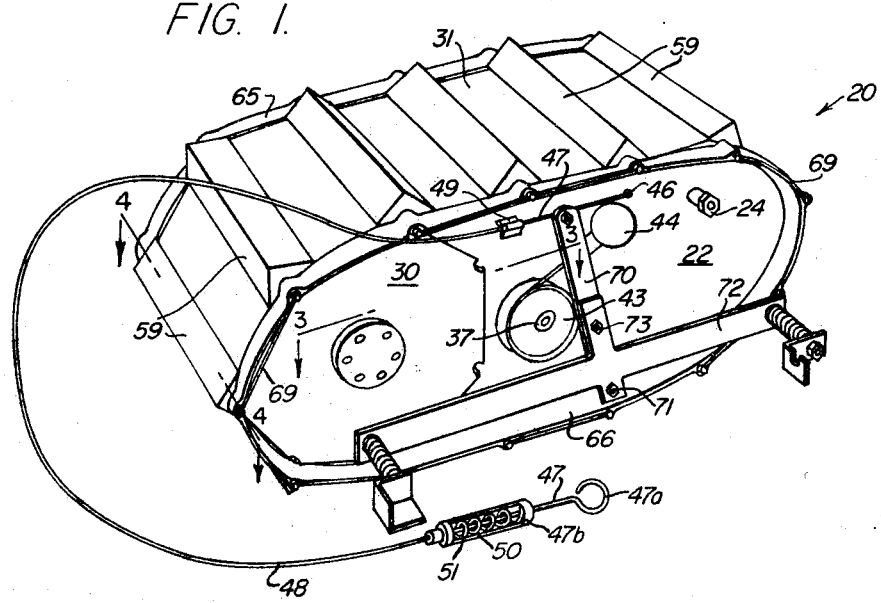

Support mountings fixed to the side plates carry a load such that the weight thereof acts downwardly through the center of gravity of the power unit to thereby insure maximum traction at all times.

BRIEF DESCRIPTION

I have found that there is a need for a small, self-contained, propulsion unit capable of travel over various types of ground covers such as snow and earth and over either smooth or very rough terrain. Such a unit can be readily used to transport people, or to carry supplies or materials from place to place.

Hunters, for example, frequently have need of a lightweight unit that they can ride and that can be used to carry game they have killed.

Thus, it is an object to provide a propulsion unit that is easily adapted for use by hunters and the like.

Skiers frequently have need of a relatively low-cost means of moving them over level terrain and up snow covered hills. A propulsion unit for such purpose must be lightweight so that the skier can easily carry it as he skis down a hill and if more than one skier is to utilize the unit, it must be capable of self-travel down a hill so that it will be available to move successive skiers up the hill.

Another object, therefore, is to provide a propulsion unit that is powerful enough to move a skier up a rather steep incline, while still being light enough in weight to be easily carried by the skier as he skis down a hill and to include means whereby the unit, after moving one skier up a hill can be returned to the bottom of the hill so that it is then available to move another skier up the hill.

Other winter sports enthusiasts like to ride ski-equipped bicycle-type frames down snow-covered slopes, but moving the frame up hills has heretofore been very difficult.

Thus, another object is to provide a propulsion unit that can be used on a bicycle-type frame to power the frame and a rider up a snow-covered hill and that can then be used as a skid on which the frame and rider can slide down the hill.

There is also a need for a low-profile, inexpensive propulsion unit that will serve as a carrier for ammunition, cargo, or demolition charges for use by the military, and particularly for such a unit that can be easily arranged to be remotely steered.

Therefore, still another object of this invention is to provide a unit that can be used to carry material and that can be easily and inexpensively remotely controlled.

Principal features of the invention include side plates that support and guide rollers on an endless belt throughout the entire length of the belt; a heat resistant, shock-absorbing, endless belt construction, that insures good traction and long belt life while substantially enclosing the space between the side plates; a gas tank constructed as a structural member between the side plates; the placement of the motor to create a pressurized zone within the belt and between the side plates; the cover-plate that acts either as a deflector of dust, mud, water, etc., or as a skid; and the support mountings that are attachable to the side frames to distribute loads to the center of gravity of the unit. The support mountings include attachments for use with ski-bindings, for riding the unit, or for carrying a material load.

Additional objects and features will become apparent from the following detailed description and the drawings, disclosing what is presently contemplated as being the best mode of the invention.

THE DRAWINGS

Figure 2:
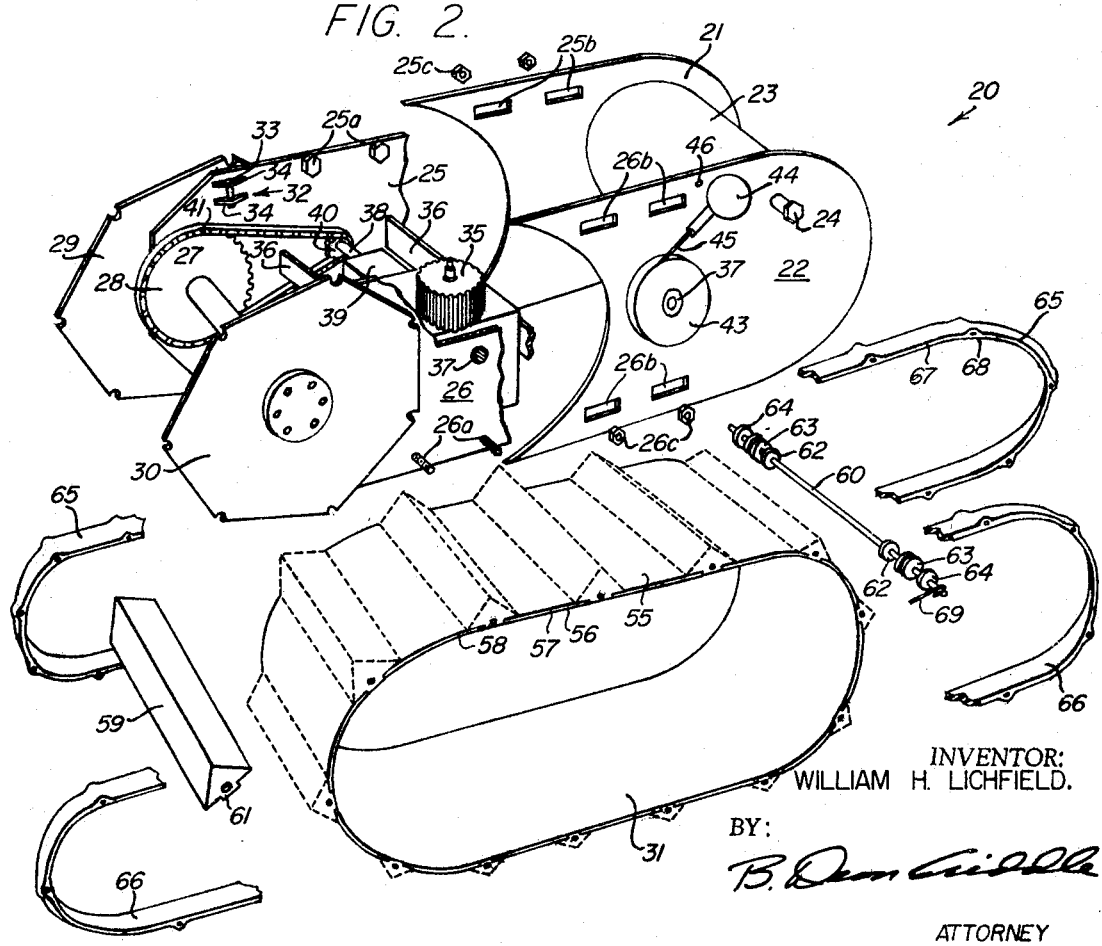

FIG. 1 is a perspective view of the basic power unit of the invention;

FIG. 2, an exploded, perspective view of the power unit of FIG. 1, without the throttle control;

FIG. 3, a horizontal section taken on the line 3—3 of FIG. 1;

FIG. 4, a similar view taken on the line 4—4 of FIG. 1;

FIG. 5, a side elevation view of the power unit, arranged to propel a skier;

FIG. 6, a top plan view of the power unit, as shown in FIG. 5;

FIG. 7, a side elevation view showing the power unit equipped with a cover plate-skid and arranged to slide down a hill while guided and controlled by tether lines;

FIG. 8, a side elevation of a ski-equipped, bicycle-type frame including a cover plate-skid fitted, power unit;

FIG. 9, a top plan view of the frame and power unit shown in FIG. 9;

FIG. 10, a side elevation view of a power unit of the invention, equipped with a riding frame;

FIG. 11, a front elevation view of the unit of FIG. 10;

FIG. 12, a view like FIG. 10, but showing the power unit traveling up a hill;

FIG. 13, a similar view, showing the power unit traveling down a hill;

FIG. 14, a fragmentary, exploded perspective view, showing how the power unit can be arranged for remote control; and FIG. 15, a view showing the power unit arranged for use with a snow plow blade.

DETAILED DESCRIPTION

Referring now to the drawings:

In FIGS. 1 and 2, there is shown a basic power unit of the invention. As illustrated, the unit, shown generally at 20, includes a pair of side plates 21 and 22, interconnected at one end by a tank 23, that serves as a structural brace between the side plates and as a gas tank for the unit. The filler spout 24 for the gas tank is provided through side plate 11, and includes a conventional tiltresponsive valve, not shown, to prevent discharge therefrom, even when the unit is tipped upside down, while still allowing normal filling and venting of the tank.

Connecting plates 25 and 26 are fixed to the inside of plates 21 and 22, respectively, by bolts 25a and 26a passed through slots 25b and 26b in the side plates and secured by nuts 25c and 26c, and the connnecting plates extend forwardly thereof to journal a shaft 27. A sprocket 28 is fixed to shaft 27, intermediate its length, and polygonal sprockets 29 and 30 are fixed at opposite ends thereof. While the sprocket 28 is shown inside the connecting plates, it should be obvious that shaft 27 and extend through a connecting plate and the sprocket could be mounted exteriorly thereof.

Polygonal sprocket 29 and 30 overlap the connecting plates 25 and 26 respectively, and bearings 32 are fixed to each of the connecting plates 25 and 26 to provide a reduced frictional engagement with the polygonal sprockets 29 and 30. These bearing can be tapered roller bearings, having their axes 33 supported by brackets 34 on the inside of connecting plates 25 and 26 and their roller surfaces extending through the side plates to serve as thrust bearings for the polygonal sprockets, as shown, or they can be other types of bearings, such as nylon buttons (not shown) fixed to the exterior of the connecting plates, for example.

A motor 35 is mounted between the connecting plates and is supported by crossbars 36, an input shaft 37 that extends from the motor, and that is journaled through the connecting plate 26, and an output shaft 38 of a gear box 39 that is coupled to motor 35, the output shaft being journaled through connecting plate 25.

A sprocket 40 is fixed to output shaft 38, in alignment with sprocket 28 and the sprockets are driving interconnected by a chain 41. Thus, operation of motor 35, through gears in gear box 39 drives shaft 38 and sprocket 40, which in turn drives sprocket 28, shaft 27 and the polygonal sprockets fixed thereto. As previously noted, shafts 38 and 27 can be extended through one of the connecting plates and the sprockets 40 and 28 can be affixed outside of the connecting plate and the chain 41 will then be more accessible. A removable cover plate (not shown) would then cover both sprockets and the chain to keep out dirt.

A pull starter 43 is fixed to input shaft 37 of the motor at the outside of side plate 22 and pulling on handle 44, affixed to the wind-up cord 45, will start motor 35, in conventional fashion.

A small hole 46 in the side wall 22 has a throttle wire 47 passed therethrough to be connected to the throttle valve of the motor, also in conventional fashion. The wire is then passed through a cable housing 48 that is secured to side plate 11 by clamps 49 and through a hollow handle 50, fixed to the free end of the cable housing, before terminating in a loop 47a.

A spring 51, in the handle 50, acts against an abutment 47b, fixed to wire 57 to bias loop 57a away from handle 50 and the throttle valve closed. An operator can thus grasp handle 50, insert this thumb through loop 47a and control operation of the unit, by moving his thumb toward the handle, in opposition to the biasing effect of spring 51. Full movement of loop 47a toward handle 50 will choke the motor to facilitate starting and a lesser movement will determine the operating speed of the motor.

A motor, manufactured by the Olsen and Rice Company, has been found very satisfactory for many purposes, and this motor has a centrifugal clutch that will not engage the gears in the gear box until a predetermined motor speed has been achieved. This prevents the motor being overloaded and stopping during intial operation. However, other motors could as well be used and the type and kind of motor used and the size of the motor will be dependent upon the use to be made of the unit.

The continuous traction belt 31 is supported throughout the major portion of its travel by the side plates 21 and 22, but is thereafter supported by the connecting plates 25 and 26 and the polygonal sprockets, with the belt substantially enclosing the space between the plates and polygonal sprockets. Thus, whenever the motor is operated, the blower of the motor, discharging into the confined space, raises the pressure therein slightly. The slight pressure differential, inside and outside the unit, is sufficient to prevent dust, moisture, etc., from getting inside to damage the motor.

Belt 31 has an endless central portion 55 of laminated construction, with the inner, or bottom lamination 56, having a reflective surface of aluminium foil or reflective polyester resin, for example, that will minimize the effects of heat from the motor on the belt. The other laminations, 57 and 58, are of reinforced rubber or poly-ure-thane construction.

A series of evenly-spaced, triangular shaped, cleats 59, preferably made of steel, plastic or aluminum, extend transversely across the outer surface of the belt, with each cleat being fastened to the belt by a spring steel axle 60 that is passed through openings provided therefor between the laminations 57 and 58 and through depending flanges 61 at opposite ends of the cleats. A washer 62, FIGS. 2 and 4, separates each edge of the belt from a double flanged roller 63 on the axle and another washer 64 separates each roller and the corresponding, depending flange 61 of the cleat 59. It is also possible for the cleats to be molded integrally with the belt and of the same material, and for the molded portion to have flanges formed to cap the ends of the axles to hold them against withdrawal.

As shown, outer portions 65 and 66 of the belt 31 are also of endless, laminated construction, with the laminations 67 and 68 having evenly spaced openings therethrough to correspond with and to receive the spaced axles 60. No reflective lamination is provided interiorly of the outer portions since they are not exposed to the heat of the engine. The outer portions serve a dual purpose of holding the rollers 63 in place and of providing an increased surface area for broader distribution of the weight of the unit and any load carried thereby. Steel wires 69 are passed through holes provided therefore in the ends of two or more adjacent axles 60 and are bent or otherwise secured to prevent the axles coming out of the openings through the central and outer portions of the belt.

In operation, the polygonal sprockets, driven by motor 35, through sprockets 40 and 28 and chain 41, engage the axles 60 to drive the belt. As the belt is passed around the side plates 21 and 22, the rollers 63 straddle the edges of the side plates to reduce friction, guide the belt in its travel and keep the belt from coming off the side plates. The polygonal sprockets also engage and are straddled by the rollers and as the belt is travelled between the side plates and the polygonal sprockets, the inside edges of the rollers travel on the edges of the connecting plates 25 and 26. Belt tension is set by loosening nuts 25c and 26c and by changing the relative positions of the connecting and side plates before re-tightening the nuts. The roller spacing of the belt is designed such that two rollers on each side of the belt will straddle the center longitudinal axis of the unit while rollers at the other end of the belt and in mesh with the sprockets are at the end of the longitudinal axis. This insures the belt being taut during its entire travel and enhance the closed effect on the motor so that pressure can develop to prevent the entry of and accumulation of dirt, snow, etc.

The weight of the motor, gear box, gas tank and frame is distributed through the frame to the axles of the belt and then to each of the cleats and/or belt surface that is in ground engaging relationship. Shock forces, created as the unit is travelled over the ground, are to a great extent absorbed by the spring steel axles. This reduces overall wear on the power unit and, with the heat reflective lamination, helps to insure maximum belt life.

The side plates 21 and 22 and connecting plates 25 and 26 are preferably made of a lightweight material such as aluminum or magnesium. These materials, in addition to keeping the weight of the unit low, also readily transmit enough heat from the engine to prevent ice accumulation on them and "freezing up" of the unit.

The power unit can be used in a great many ways, for a variety of purposes, but, if maximum effectiveness is to be obtained the load to be transported by the unit must be approximately at its center of gravity. For this reason, a loading bar 70 is fixed to the outside of each side plate 21 and 22 by bolts 71, such that the loading bars intersect the transverse line through the center of gravity of the unit. A mounting bar 72 is connected to loading bar 70 by one or more bolts 73, so that a load fixed thereto will be transmitted to approximately the center of gravity of the unit. Obviously, the loading bar can be connected or formed integral with either the connecting plates or the side plates, and structures other than the illustrated bars can be used to support and transmit a load.

As is shown in FIGS. 5 and 6, for example, skis S and a skier (not shown) can be attached to the mounting bars, with one ski on each side of the power unit and with the skier then straddling the unit.

Notched plates 74 are fastened to the forward ends of the mounting bars 72 by springs 75, so that the notches will fit beneath the projections 76 of the ski bindings. Other L-shaped plates 77 are similarly fastened to the rear ends of mounting bars 72 by springs 78, so that one leg of each plate will fit beneath the skiers heel and the other will extend upwardly behind the heel and be held in place by a spring biased catch 79 of the ski bindings. For different types of ski bindings, other connecting devices may be required, and are contemplated. The use of the springs 75 and 78 will allow the connecting devices to fit a wide size range of bindings.

In any event, the skier, after starting the power unit and fastening the connecting devices to his skis operates the throttle control to start movement of the power unit, and to propel him over the ground surface. Should he lose his balance, he will release the throttle control and the motor will immediately idle and the clutch will disengage.

If the power unit is used to move a skier up a hill, he can release the skis from the connecting devices, replace the skis on his boots and ski down the hill in normal fashion while carrying the power unit on his back with a carrying strap, not shown, but easily attached to the loading or mounting bars, for example. The entire unit can weigh as little as twenty to thirty pounds, including a full tank of gasoline, so it can be easily carried by an adult or youth.

Also, if a number of people are to use the power unit as a ski lift, or if a single person desires to use the power unit as a ski lift, but without carrying it back down as he skis, it is a simple matter for an individual going up the hill to drag a light tether line 80, FIG. 7, that has been secured to a stake 81 at the bottom of the hill and to stake the end of the line at the top of the hill as at 82. Thereafter, whenever the power unit is at the top of the hill it is turned over so that it rests on a combined cover plate-skid 83 to slide back down the hill. A line 84, fastened to the curved end of the cover plate-skid has a snap ring 85 that is quickly attached to the line 80, which serves as a guide for the downwardly sliding power unit. Near the bottom of the hill another line 86 is fastened to and splits-off from line 80. Line 86 is also staked as at 87, and, as the snap ring slides down lie 80 with the power unit, it will slide onto both of the split lines 80 and 84 to gradually bring the power unit to a halt. The next skier desiring to go up the hill will simply disconnect the snap ring and attach the unit to his skis in the manner heretofore described.

The cover plate-skid 83 will, in addition to providing a sliding surface for the power unit, also keeps snow, dirt, etc., from being thrown upwardly onto a skier, a rider or a load. Cover plate-skid 83 is attached to slide plates 21 and 22 in the same manner as the cover plate-skids hereafter described. The cover plate-skid can also serve as a chain guard, if the drive chain is placed exteriorly of the unit and as a shield for the engine intake.

In FIGS. 8 and 9, the power unit, shown generally at 20, is arranged to propel a ski-equipped frame 88. As shown, the frame is of substantially conventional bicycle-type, with a front fork 89, pivotally attached by pins 90 to a ski 91. The front fork has a central shaft 92, journaled through a tubular housing section 93 and terminating in handlebars 94. Frame braces 95, 96, and 97, are secured to tubular housing section 93 and support a saddle seat 98 and braces 99 and 99' extend rearwardly thereof and are forked to receive the power unit. The power unit 20 is pivotally connected centrally thereof, at 100, to the braces 98 and 99 and is releasably connected to braces 99 and to braces 101 that extend rearwardly of braces 99', as by bolts 102, when the cover plate-skid 103 is above the power unit. In this position, the endless track will propel the frame, which is steered by turning the handlebars and the ski attached to them. The rider sits on seat 98 and rests his feet on platforms 104, attached to braces 96, 97, and 99'.

The cover plate-skid 103 is secured to the side plates of the power unit 20 by bolts 105 that are inserted through braces 106 of the cover plate-skid and threaded into holes tapped in the side plates. Braces 106 extend outwardly from the side plates to allow for proper clearance of the endless track.

In use, when a rider has ridden the frame to the top of a hill, he will remove bolts 102, turn the power unit over (by revolving it about the pivot axis formed at 100) and reinsert the bolts 102, through holes 107 provided therefore in braces 99. This secures the power unit with the cover plat-skid therebeneath, and with the curved portion of the cover plate-skid turning upwardly at the front of the power unit. The rider can now re-mount and slide down the hill on ski 91 and cover plate-skid 103. The throttle control is the same as hereinbefore described and is mounted on the end of one handlebar for convenient operation. By replacing ski 91 with a wheel, the unit of FIGS. 8 and 9 can be readily operated over hard terrain.

The power unit can also serve as an inexpensive and handy transport for hunters and the like, even without a front ski or wheel. As shown in FIGS. 10–13, mounting bars 72 are fixed to loading bars 70 by bolts 108 and serve as lower crossbars for a frame including bifurcated legs 109 and bifurcated legs 110 that are pivotally connected to the mounting bars. Posts 111 and 112 extending upwardly from legs 109 and 110 respectively and upper crossbars 113, are pivotally connected to the posts 111 and 112.

A curved rack 114 is fixed to post 111 and a spring biased catch 115 is connected to crossbars 113 such that it will engage the rack. A cable 116 is attached to catch 115, passes around a pulley 117 and is connected to a handle 118 that is pivotally mounted on post 112 such that squeezing of the handle toward post 112 will pull on the cable to pull on catch 115 and to release it from engagement with the rack.

In use, a rider will start the motor of power unit 20 as hereinbefore described and will control its operation in the manner previously described by operating the throttle through wire 47 and the handle 50 which is mounted adjacent the top of post 112.

The rider sits on the seat and places his feet on pedals 119 that are journaled on axles 120, extending outwardly from the lower end of straps 120a that are pivotally connected to the center of intermediary braces 121 that are pivotally connected at their ends to legs 109 and 110, and that extend parallel to and level with the longitudinal axis of the power unit. In going uphill, he pivots handle 118 forward to release catch 115 and then leans forward until his weight is acting downwardly through the center of gravity of the power unit. The frame shifts with the rider's weight, but because of the parallelogram linkage, the intermediary braces 121 and crossbars 113 will always remain parallel to the mounting bars 72. Handle 118 is then released to allow catch 115 to again engage rack 114 and stabilize the frame. In going downhill the handle 118 is again pivoted, the rider leans back to shift the frame and to place his weight over the center of gravity and the handle is released to allow catch 115 to lock the frame in position. Each time a significant change in attitude results during travel, the frame must be shifted to insure application of weight through the center of gravity and maximum traction of the unit. The arms 120a freely swing so that weight applied through the pedals 119 will also be properly distributed.

The unit is not designed for fast travel, but because of its lightweight construction and versatility, it can be easily used by hunters and the like and can support the hunter, or a dead animal as the hunter walks alongside.

Other uses will also be apparent. For example, it is a simple matter to pivotally attach a bail-type handle 122 (FIG. 15) to the loading bars 70 with the connecting members protruding forwardly of the unit to terminate in a snow plow blade B or other similar equipment.

Other types of lead carrying frames can be employed, mounted in the same fashion as cover plate-skid 103, for example. These could be used to carry supplies, ammunition or demolitions by the military or for many other purposes.

The power unit can be easily remotely controlled, since it is only necessary to add a housing 125, FIG. 14, outside of each of the side plates 21 and 22 and to connect the bottoms of the housings via hoses 126 with the intake of the engine. A radio controlled solenoid valve 127, connected to the hoses 126, then alternatively connects the intake to vent or to the interior of the housings 125. When connected with one of the housings, a vacuum is created to pull a diaphragm 128 and a pin 129 fixed thereto, inside the housing, down, until the pin engages and drags along the ground over which the power unit is traveling. The power unit then swings around that pin. When the radio controlled valve is returned to its normal condition venting both housings 125, the vacuum in the housing is broken and the resiliency of the diaphragm returns it to its normal position, wherein pin 129 is no longer in engagement with the ground. By proper actuation of the radio controlled valve, the diaphragms and pins of each housing at opposite sides of the power unit can be regulated and the direction of travel of the unit can be easily remotely controlled.

Although preferred forms of my invention have been herein disclosed, it is to be understood that the present disclosure is made by way of example and that variations are possible without departing from the subject matter coming within the scope of the following claims, which subject matter I regard as my invention.

I claim:
1. A propulsion unit, comprising
a pair of side plates having peripheral edges;
means including a gas tank extending from one side plate to the other holding said side plates a spaced distance apart;
an imperforate endless belt surrounding said side plates and bridging over them;
spaced axles along the belt and secured thereto;
rollers carried by said axles and arranged to roll on the edges of said side plates;
spaced cleats fixed to and extending transversely across the exterior of the belt;
a motor positioned between the side plates and within the endless belt;
drive means interconnecting the motor and the endless belt, whereby said motor drives the belt;
means outside the side plates for controlling operation of said motor; and
bracket means centrally fixed to the side plates exteriorly thereof for supporting a load and positioned to transmit the weight of the load downwardly substantially through the center of gravity of the unit.

2. A propulsion unit according to claim 1, further including means responsive to radio control for steering the unit.

3. A propulsion unit according to claim 1, further including a handle extending upwardly and rearwardly from the side plates and forwardly thereof, means pivotally connecting the handle to the load supporting means, and a snow plow blade fixed to the forwardly extending portion of the handle.

4. A propulsion unit, according to claim 1, wherein the axles are of spring steel.

5. A propulsion unit, according to claim 4, wherein the endless belt is made up of a plurality of layers of reinforced wear material and an inner layer of heat reflective material; and wherein the spaced cleats are fixed to the exterior of the belt by the spring steel axles.

6. A propulsion unit, according to claim 1, wherein the drive means interconnecting the motor and the belt includes sprockets, outside the side plates and arranged to mesh with the spaced axles.

7. A propulsion unit, according to claim 6, wherein the sprockets overlap the side plates; and wherein bearing means are provided between the sprockets and the side plates to reduce friction losses as the sprockets turn with respect to the side plates.

8. A propulsion unit, according to claim 1, further including
a cover plate-skid positioned outwardly of one run of the endless belt; and
means rigidly securing said cover plate-skid to the side plates.

9. A propulsion unit, according to claim 8, wherein the cover plate-skid is curved at one end thereof, said curved end substantially following the curve of the endless belt.

10. A propulsion unit, according to claim 9, wherein the means fixed to the side plates exteriorly thereof for supporting a load comprises means for securing said side plates to ski bindings.

11. A propulsion unit, according to claim 10, further including
a tether rope having one end fixed to the cover plate-skid and a snap ring on the other end thereof adapted to be snapped around a guide line.

12. A propulsion unit, according to claim 9, wherein the means fixed to the side plates, exteriorly thereof, for supporting a load comprises a frame having a seat thereon; and further including a guide member; means for controlling the guide member to regulate the direction of travel of the frame.

13. A propulsion unit according to claim 12, wherein the side plates are fixed to the frame by a central pivot member and a removable lock member, and means whereby the lock member can be removed, the cover plate-skid, endless belt, and side plates can be turned around the pivot member and the removable lock member can be inserted to secure the side plates, with respect to the frame.

14. A propulsion unit according to claim 9, wherein the means fixed to the side plates, exteriorly thereof, for supporting a load comprises a parallelogram frame including front and rear legs straddling the endless belt at the front and rear thereof, respectively, lower crossbars fixed to the side plates and extending parallel to the central longitudinal axis of the propulsion unit and pivotally connected to the lower ends of the legs, front and rear posts extending upwardly from the front and rear legs, respectively, a seat on the rear post, a hand grip on the front post, an upper crossbar pivotally interconnecting the front and rear posts, beneath the seat, means for adjustably locking the position of the rear post with respect to the upper cross bar, intermediate braces pivotally interconnecting the front and rear legs and extending parallel to the central longitudinal axis of the propulsion unit and on level therewith, arms pivotally connected to the center of said intermediate brace and suspended therefrom, and pedals extending outwardly from the lower ends of said arms.

References Cited

UNITED STATES PATENTS

| | | | |
|---|---|---|---|
| 1,068,883 | 7/1913 | Frank | 180—5 |
| 1,404,882 | 1/1922 | Moore | 180—9.22 X |
| 2,345,496 | 3/1944 | Opheim | 180—5 X |
| 2,702,088 | 2/1955 | Klimek | 180—5 |
| 2,817,536 | 12/1957 | Taggert | 280—11 |
| 2,832,426 | 4/1958 | Seargeant | 180—2 |
| 2,855,059 | 10/1958 | Sutherland | 180—5 X |

FOREIGN PATENTS

| | | |
|---|---|---|
| Ad. 150,508 | 6/1940 | France. |
| 1,402,493 | | Great Britain. |

RICHARD J. JOHNSON, Primary Examiner

U.S. Cl. X.R.

37—16; 180—9.24; 305—38